Feb. 24, 1931.  G. E. WASELL  1,794,096
COMBINED PASSENGER AND AMBULANCE AUTOMOBILE VEHICLE
Filed March 25, 1927
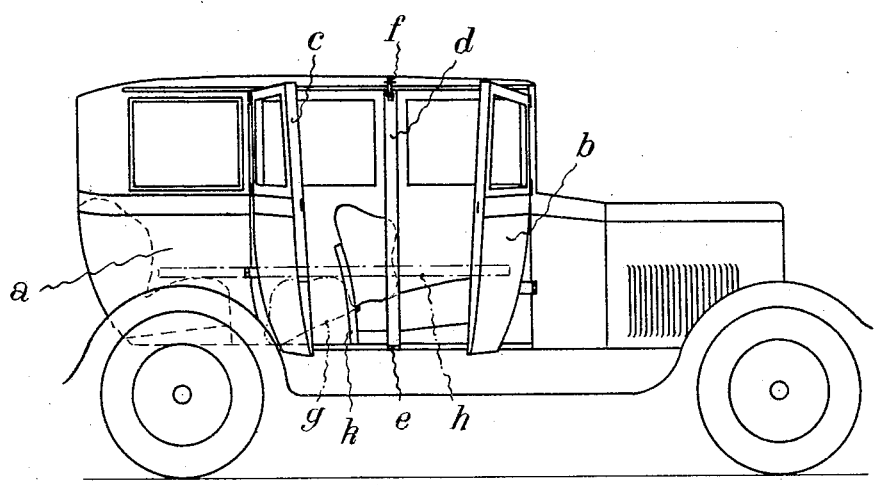
Inventors
G. E. Wasell Patented Feb. 24, 1931

1,794,096

UNITED STATES PATENT OFFICE

GEORG EDVARD WASELL, OF LUND, SWEDEN

COMBINED PASSENGER AND AMBULANCE AUTOMOBILE VEHICLE

Application filed March 25, 1927, Serial No. 178,404, and in Sweden April 3, 1926.

It has been a long felt want to be able to convert quickly and easily passenger cars, especially those utilized by physicians, into ambulance vehicles, and this in such a way that the sick or injured person may be conveyed on a hand-barrow to and from the vehicle in substantially the same expedient manner as is the case in utilizing the special type of ambulance vehicles. The contrivances necessary for such conversion must however be such that they, if not utilized, should not be in the way, when the vehicle is used as ordinary passenger car. To this end the most suitable automobiles are those having a fixed hood and at least four seats, and amongst these the so called sedan type cars, that is cars without a partition between the front and rear seats, are the only ones which come into consideration for the contemplated purpose.

The object of the invention is to provide means for converting this type of closed passenger cars into an ambulance vehicle as set forth in detail in the following description and particularly pointed out in the claims annexed thereto.

In the accompanying drawing an automobile provided with the contrivances according to the invention is diagrammatically illustrated.

The car shown is a so called four door sedan, that is a covered body inclosing a single room with four seats including the driver's seat and having two doors on each side of the body. To adopt the invention to this type of cars there is required that the hinges of the foremost doors are arranged on their front edges, so that these doors open in opposite manner to the rearmost doors, and such cars have already been constructed and enjoy a great demand.

Referring to the drawing $a$ indicates the body which is provided on each side with a front door $b$ to be opened in forward direction and a rear door $c$ to be opened in backward direction. This arrangement forms one part of the invention combination.

According to the invention a door post between the two doors is either left out entirely or is rendered removable or to be folded down or up. The door post may of course vary in width according to the type of body used, and generally it is desired to have the doors as wide as possible, so that the door post will have the form of a slim post $d$. As illustrated in the drawing this door post is attached at its lower end to the floor of the body by means of a hinge $e$, while its upper end is connected to the roof of the body by means of a bolt $f$ or the like. When this bolt $f$ is withdrawn the door post $d$ obviously may be folded down, so that the whole opening between the hinges of the doors will be entirely free and so great that a hand-barrow with a patient thereon may be pushed into the vehicle without any difficulty, in a somewhat oblique direction relatively to the longitudinal axis of the vehicle.

Instead of folding the door post $d$ downwardly it may of course also be folded up, in which case the upper end of the door post is attached to the roof of the body by means of a hinge, while its lower end is provided with a bolt for connecting it to the floor of the body. And the door post may be provided both at its upper and its lower ends with ledge bolts, so that it may be removed entirely and placed aside. Thus the second feature of the invention combination consists in that either a door post is not existing at all or if it exists it is made removable or to be folded up or down.

After the hand-barrow has been properly installed in the vehicle, the door post $d$ is again placed in its proper position and the doors are closed in the ordinary way. If there should lack a door post the doors may be bolted up and down by a mechanism to be operated by the door handle in a manner known per se.

The third feature of the invention combination consists in that the back of the front seat adjacent that side of the vehicle where the door post in removable or to be folded up or down or is lacking entirely, is adapted to be folded preferably backwards so that it will rest on the floor of the body between the front and rear seats. This is illustrated in the drawing by dotted lines as at $g$, and also the hand-barrow is shown with dotted lines as at $h$. It is obvious that the hand-barrow is meant to be placed on the front seat which is not used as driver's seat, and further it will only be necessary to make provisions for a wide opening on this same side of the vehicle, while the doors at the opposite side may be carried out in conventional manner.

When the hand-barrow is not employed it should be stowed away so as not to be in the way and preferably so that it is not visible.

For this purpose a hand-barrow of the telescoping kind is most suitable, because it may in pushed in condition be placed in the vehicle in transversal direction behind the backs of the front seats, as indicated with $k$ in the drawing, and if it is placed in a cover of suitable material and attached to the said backs by means of straps it will scarcely be visible and not form a hindrance, when the vehicle is used as ordinary passenger car. The said cover for the hand-barrow may have the form of a detachable flap depending from the upper edges of the front seats and if this flap is made of the same material as the coverings for the seats, it will not be noticed that it hides a hand-barrow. It is to be understood that the hand-barrow may also be stowed away on the baggage carrier or in a special drawer arranged underneath the vehicle body or in any other suitable manner, because it is immaterial for the scope of the invention where the hand-barrow is kept, when it is not in use.

What I claim as my invention and desire to secure by Letters Patent is:—

1. In a passenger vehicle of the class described having the body formed to provide an entrance space on one side of the vehicle, a door post bridging this space, and doors hingedly connected to the body to cooperate with the post to close said space, said post being movably connected with the body to permit it to be removed from a position bridging such entrance opening, whereby with the post so removed and the doors opened the entrance opening is unobstructed throughout its full width.

2. In a passenger car, a body formed in one side with an entrance opening, a post extending vertically of the body and across the opening, and doors hinged to the body and cooperating with the post to close said opening, the post being independently movable with respect to the body to provide for an unobstructed entrance opening when the doors are opened.

3. In a passenger car, a body formed on one side with an entrance opening, a post extending vertically of the body and across said opening, means whereby the post may be held in fixed relation to the body, said means being operable at will to release the post for movement to an unobstructing position relative to said entrance openings, and doors hinged to the body with their free edges adapted to cooperate with the post when in fixed relation to the body to completely close the entrance opening.

4. A body construction for vehicles of the closed car type having a front door and a rear door opening in opposite directions, means detachably connected with the body construction and with one of the doors whereby all of the side of the car between the front edge of the front door and the rear edge of the rear door may be opened up without obstruction so as to permit the insertion of an invalid cot therein.

In testimony whereof, I have signed my name to this specification.

GEORG EDVARD WASELL.